(12) United States Patent
Parenti

(10) Patent No.: US 7,268,557 B2
(45) Date of Patent: Sep. 11, 2007

(54) METHOD AND APPARATUS FOR PREDICTING SEISMIC EVENTS

(76) Inventor: Roberto Parenti, Via Bondi 12, 40138 Bologna (IT)

( * ) Notice: Subject to any disclaimer, the term of this patent is extended or adjusted under 35 U.S.C. 154(b) by 0 days.

(21) Appl. No.: 10/543,460

(22) PCT Filed: May 12, 2003

(86) PCT No.: PCT/IT03/00282

§ 371 (c)(1),
(2), (4) Date: Jul. 26, 2005

(87) PCT Pub. No.: WO2004/074870

PCT Pub. Date: Sep. 2, 2004

(65) Prior Publication Data

US 2006/0152223 A1    Jul. 13, 2006

(30) Foreign Application Priority Data

Feb. 21, 2003  (IT) .......................... BO2003A0082

(51) Int. Cl.
*G01V 3/08*    (2006.01)
(52) U.S. Cl. .......................... 324/348; 324/72; 340/690
(58) Field of Classification Search ................ 324/72, 324/323, 347–348; 340/690
See application file for complete search history.

(56) References Cited

U.S. PATENT DOCUMENTS

| | | | |
|---|---|---|---|
| 2,234,956 A | 3/1941 | Bilinsky | |
| 4,296,379 A | 10/1981 | Yoshizumi | |
| 4,612,506 A | 9/1986 | Varotsos et al. | |
| 4,837,582 A | 6/1989 | Takahashi et al. | |
| 5,783,945 A | 7/1998 | Balbachan | |
| 5,861,750 A | 1/1999 | Anderson et al. | |

FOREIGN PATENT DOCUMENTS

| | | |
|---|---|---|
| EP | 0 067 924 | 12/1982 |
| EP | 0 457 788 | 11/1991 |
| EP | 0 623 221 | 11/1994 |
| GB | 2 283 099 | 4/1995 |

OTHER PUBLICATIONS

Y. Yamazaki, 1980, A Telemeter System of the Resistivity Variometer, *Bulletin of the Earthquake Research Institute*, University of Tokyo, 1980, Japan, vol. 55, pt. 3, pp. 737-754, XP008023657, ISSN: 0040-8972, partially translated.

(Continued)

*Primary Examiner*—Bot LeDynh
(74) *Attorney, Agent, or Firm*—McGlew and Tuttle P.C.

(57) ABSTRACT

The method for predicting seismic events includes supplying electricity by means of a detection unit (3) fitted with current electrodes (A, B) and potential probes (M, N) arranged in the ground and detecting electrical current and induced potentials by means of said electrodes (A, B) and said reception probes (M, N), for the calculation of resistivity in the ground. The resistivity data recorded is acquired and stored and then transferred to a means of analysis and processing (11). Finally, resistive drops in relation to preset values, corresponding to the approach of seismic events are evaluated.

7 Claims, 1 Drawing Sheet

OTHER PUBLICATIONS

Y. Yamazaki, 1980, A Ground's Resistivity Change at Aburatsubo Associated with the Izu-Hanto-Toho-Oki Earthquake of 1980, *Bulletin of the Earthquake Research Institute*, University of Tokyo, 1980, Japan, vol. 55, pt. 4, pp. 1115-1122, XP008023656, ISSN: 0040-8972, partially translated.

T. Rikitake et al., 1976, Resistivity Changes as a Precursor of Earthquake, *Journal of Geomagnetism and Geoelectricity*, 1976, Japan, vol. 28, No. 6, pp. 497-505, XP008023495, ISSN: 0022-1392.

Y. Yamazaki, 1980, Preseimsic Resistivity Changes Recorded by the Resistivity Variometer, *Bulletin of the Earthquake Research Institute*, University of Tokyo, 1980, Japan, vol. 55, pt. 3, pp. 755-794, XP008023658, ISSN: 0040-8972, partially translated.

METHOD AND APPARATUS FOR PREDICTING SEISMIC EVENTS

TECHNICAL FIELD

The following invention regards a method for predicting seismic events and apparatus for putting such a method into practice.

BACKGROUND ART

Various techniques have been proposed for predicting seismic events such as earthquakes in particular. Generally speaking, the methods proposed are based on the measurement of variations in the magnetic field, earth currents, propagation speed and frequency.

U.S. Pat. No. 4,612,506 in the name of Varotsos and others illustrates, for example, an earthquake prediction method based on transitory variations in electrical earth currents, detected by electrodes buried in the ground. The method involves selecting parts of the abovementioned transitory variations in electrical earth currents for preset frequency ranges. The amplitude of these currents is then compared with preset standard values, in order to obtain a forecast on intensity, dislocation and/or time of occurrence of an imminent earthquake.

Another seismic event prediction system, illustrated in patent EP 623.221 in the name of Röder and others, uses a measurement device that records fluctuations in the electric field, detected by one or more electrical conductivity probes, with amplification by means of an electronic circuit and subsequent treatment in a processing unit. Potential fluctuations are produced in an empty space near to the surface of the ground and are recorded in relation to a reference potential existing on the surface.

Patent EP 457.788 in the name of Love and others illustrates a method for real estate surveillance such as public and industrial buildings, which involvess measuring variations in the electrostatic field, within the material to be monitored, by means of a suitable probe, and amplifying the HF components of the measurement signal.

Another method, illustrated in U.S. Pat. No. 4,837,582, includes detecting the magnetic waves that are generated before an earthquake occurs by means of an aerial located on the land or on the seabed.

However, known methods are only able to predict the occurrence of an earthquake, its epicentre and intensity or magnitude in an extremely vague way.

DISCLOSURE OF INVENTION

The aim of the present invention is to resolve the abovementioned drawbacks by devising a method that makes it possible to efficiently predict the occurrence of seismic events.

Within the context of this aim, a further aim of the invention is to provide apparatus for predicting seismic events with simple manufacture, reliable operation and versatile use.

The abovementioned objectives can be achieved in agreement with the content of the claims herein.

BRIEF DESCRIPTION OF DRAWINGS

Description details of the invention shall be further evident in the illustration of a preferred type of apparatus for predicting seismic events, in the guideline drawings attached and wherein.

MODES FOR CARRYING OUT THE INVENTION

Figure 1:
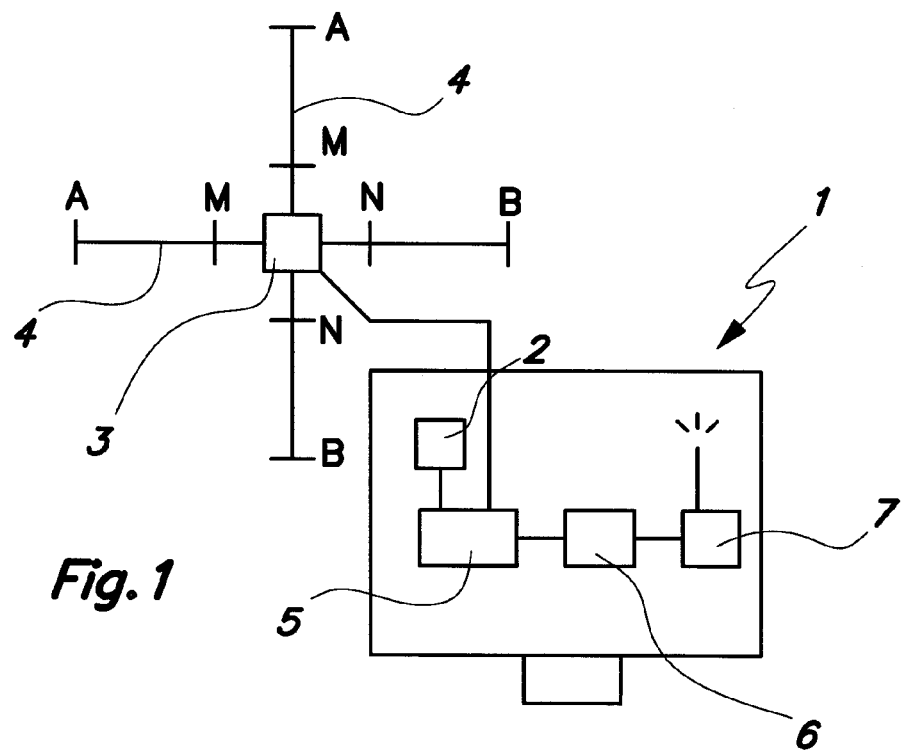
FIG. 1 is a block diagram of the apparatus for predicting seismic events in object.
Figure 2:
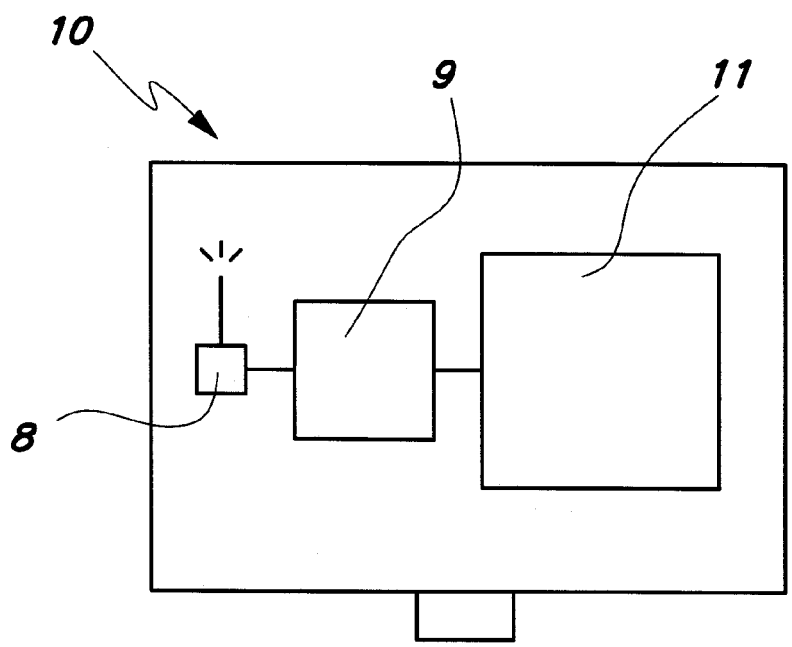
FIG. 2 is a block diagram of the apparatus for predicting seismic events in object.

With reference in particular to FIG. 1, 1 indicates as a whole a remote unit for detecting the electrical resistivity of the ground, constituted preferably by a small, armored above-ground or buried construction that is thermally insulated and fitted with electrical connections and an external protection area.

The detection station 1 is fitted with a direct current electricity supply unit 2 with, for example, one or more rechargeable accumulators.

The electricity supply unit 2 is connected to a detection unit 3 fitted with a series of special alloy current electrodes A, B arranged in the ground, at a suitable depth, connected by the respective cables 4, fitted with suitable protective sheaths. Special alloy potential probes M, N are also arranged along the length of the cables 4, for the reading of both spontaneous and induced potentials.

The connection cables 4 are arranged in a cross-shape in the ground, according to a preset direction, in a way that is already known in the field of geophysical measurements, and stretch for a suitable length.

For example, the laying of 900 meters of special unipolar cable is foreseen for each branch of the electrodes A, B and 300 meters of special unipolar cable for each branch of the potential probes M, N.

In particular, the closure of the circuit requires below-ground laying of two symmetrical quadripoles of the so-called Wenner type, perpendicular to one another, or Schlumberger type, dipole, tripole and similar.

In addition to the electricity supply unit 2, the electrodes are connected in turn to a data acquisition unit 5 in order to be able to serve alternatively as current or measurement electrodes.

The data acquisition unit 5 is suitably composed by a digital electronic device with high input impedence (50-100 M$\Omega$), sensitivity and resolution, capable of continuously recording both spontaneous potentials and resistivity measurements.

The data recorded is transferred to a memorisation unit 6 and then transmitted to a main unit 10. Data transmission is performed in real time, for example, by radio using a transmission module 7 located inside the detection station 1 and a reception module 8 located inside the main unit 10.

The main unit 10 is fitted with a memorisation unit 9 for storing the data detected, interfaced with a data analysis and processing unit 11, in order to evaluate the drops in resistivity in comparison to the preset values.

The present method for predicting seismic events requires the use of a number of electrical ground resistivity detecting stations 1 of the type described, arranged in suitably distanced areas over the territory. In particular, such detection station should at least be installed in areas that are seismically and potentially active.

The number of detecting stations 1 to be installed obviously depends on the amplitude of the territory to be monitored.

The detecting stations 1 must not be installed in areas prone to hydro-geological, hydraulic, volcanic risks or forest fires and similar. It is also fundamental that an area with a radius of, for example, 750 meters, is free of earthing, metal ducts, railway lines, freight telpherages and similar of any type.

In each detection unit 1 periodic readings of the electrical ground resistivity are made on the basis of induced potential measurements, preferably purified of the spontaneous potentials, and current intensity, according to the parameters of the quadripoles arranged in the ground. In practice one energizes the ground, using electrodes A, B powered by the supply unit 2 and therefore measures the intensity of the current and induced potentials using the same electrodes A, B and the probes M, N to calculate the value of resistivity, according to the known relationship $\rho = V.k/I$ where k indicates the parameter relative to the quadripole setting.

The resistivity data detected by each detection unit 1 is acquired and memorised and then transferred to the data analysis and processing unit 11 of the main unit 10, in order to evaluate the drops in resistivity in relation to the preset values in the various detection units 1 and therefore be able to identify the area in which high resistive drops in comparison with the normal range, which correspond to the nearing of a seismic event, occur. For example, if in an area the normal value of resistivity is within the 10-15Ω range, a drop in detected resistivity below that range causes an alert situation whereas a further drop, for example to values around 5Ω, is a forewarning of a seismic event. Obviously the resistivity values measured depend on the characteristics of the ground that houses the detection unit.

The interpolation of the data from the different detection stations makes it possible to identify the epicentre of a seismic event.

The method and apparatus described therefore achieve the aim of efficiently predicting the occurrence of seismic events.

According to a different mode of carrying out the method in object, it is possible to use a probe that detects the resistivity or electrical conductivity of the ground or rocks, introduced into a survey hole made specially for the purpose. This hole may have a depth of approximately 300 meters. Said probe is connected to the data acquisition unit and can be linked up to or alternatively replace the douple quadripolar system described above. This increases the available values used to evaluate drops in resistivity over time, using different means of measurement that are comparable. During the data analysis phase, one therefore has greater possibilities of control, thus simultaneously eliminating all factors of disturbance. Materials adopted for the actual realization of the invention, as well as their shapes and sizes, can be various, depending on the requirements. Where technical features mentioned in any claim are followed by reference signs, those reference signs have been included for the sole purpose of increasing the intelligibility of the claims and accordingly, such reference signs do not have any limiting effect on the scope of each element identified by way of example by such reference signs.

The invention claimed is:

1. A method for predicting seismic events, the method comprising:

supplying direct current electrical energy in a plurality of ground or rock electrical resistivity or electrical conductivity detection stations, said detection stations being arranged in areas distributed over a defined territory, each detection station being connected to a detection unit having current electrodes and potential probes arranged in the ground, whereby at least one probe is introduced into a survey hole to detect the resistivity or electrical conductivity of the ground or rocks;

detecting electrical current and induced potentials in the ground via said electrodes and said potential probes for the calculation of resistivity or electrical conductivity in the ground;

acquiring and storing the detected resistivity or electrical conductivity data;

transferring said resistivity or electrical conductivity data to means for analysis and processing; and evaluating resistive drops in relation to preset values, corresponding to the approach of a seismic event.

2. A method according to claim 1, wherein said survey hole has a depth of at least 300 meters.

3. Apparatus for predicting seismic events, the apparatus comprising:

a plurality of ground or rock electrical resistivity or electrical conductivity detection stations, said detection stations being arranged in areas distributed over a defined territory, each detection station having means for supplying direct current electricity to a detection unit having electrodes and potential probes arranged in the ground, each detection station having means for acquiring the data recorded for the calculation of resistivity or electrical conductivity and means for transmitting said detected resistivity or electrical conductivity data; and a main unit having reception means for receiving the recorded resistivity or electrical conductivity data and analysis and processing means for analyzing and processing said recorded resistivity or electrical conductivity data to evaluate the resistive drops in relation to preset values, corresponding to the approach of a seismic event, said detected resistivity or electrical conductivity data being transmitted in real time via radio using said transmitting means positioned within said detection stations and said reception means positioned within said main unit.

4. An apparatus according to claim 3, wherein said electrodes and said potential probes of said detection unit are connected by cables arranged in a cross-shape in the ground, following a preset direction and stretch for a suitable length.

5. An apparatus according to claim 3, wherein said electrodes serve alternatively as current or measurement electrodes.

6. An apparatus according to claim 3, wherein said detection unit includes two symmetrical quadripoles perpendicular to one another.

7. Apparatus according to claim 3, wherein said detection unit includes a probe for detecting the resistivity or electrical conductivity of the ground, introduced at a suitable depth in a suitable surveying hole and connected by cables extended along said surveying hole.

* * * * *